(12) United States Patent
Weinberger et al.

(10) Patent No.: US 7,526,831 B2
(45) Date of Patent: *May 5, 2009

(54) ICE SCRAPER

(75) Inventors: Marvin Weinberger, Havertown, PA (US); Tucker J. Marion, St. Davids, PA (US)

(73) Assignee: Innovation Factory, Inc., Havertown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/623,867

(22) Filed: Jan. 17, 2007

(65) Prior Publication Data

US 2007/0130715 A1 Jun. 14, 2007

Related U.S. Application Data

(63) Continuation of application No. 10/174,492, filed on Jun. 17, 2002, now Pat. No. 7,249,393, which is a continuation of application No. 29/150,906, filed on Nov. 15, 2001, now Pat. No. Des. 460,589.

(60) Provisional application No. 60/298,672, filed on Jun. 15, 2001.

(51) Int. Cl.
*A47L 13/22* (2006.01)
*A47L 13/02* (2006.01)

(52) U.S. Cl. .............. 15/236.02; 15/236.07; 15/236.08; 15/236.05; 15/143.1

(58) Field of Classification Search .............. 15/236.01, 15/236.02, 236.05, 236.07, 236.08, 111, 15/143.1; D32/46, 48; D4/138; 30/169
See application file for complete search history.

(56) References Cited

U.S. PATENT DOCUMENTS

| 3,274,684 | A | * | 9/1966 | Marks .......................... 30/171 |
| 4,164,801 | A | * | 8/1979 | Thomas .................... 15/236.02 |
| 4,275,476 | A | | 6/1981 | Hopkins et al. |
| 4,418,439 | A | * | 12/1983 | Porchet .................... 15/236.02 |
| 4,712,269 | A | | 12/1987 | Worthen |
| 5,471,698 | A | * | 12/1995 | Francis et al. .............. 15/144.1 |
| 5,839,151 | A | | 11/1998 | Whaley |
| 5,908,255 | A | | 6/1999 | Branch |
| 5,915,794 | A | | 6/1999 | Neff |
| 6,018,836 | A | * | 2/2000 | Williams ...................... 15/111 |
| 6,216,306 | B1 | | 4/2001 | Esterson et al. |
| 6,243,906 | B1 | * | 6/2001 | Holliday et al. ................ 15/111 |
| 7,249,393 | B2 | * | 7/2007 | Marion et al. ............. 15/236.02 |

* cited by examiner

*Primary Examiner*—Laura C Guidotti
(74) *Attorney, Agent, or Firm*—Knoble, Yoshida & Dunleavy, LLC (57) ABSTRACT

A hand tool adapted to mechanically remove materials such as ice, frost, and/or snow from surfaces such as automobile window glass comprises a longitudinally-extending handle having a front end and a rear end, a scraper disposed adjacent the front end of the handle, a rear grip disposed adjacent the rear end of the handle, and a front grip disposed adjacent the front end of the handle. The rear grip is adapted to facilitate a user applying force to the scraper in a direction generally parallel to the length of the handle to move the scraper along a surface to be scraped, and the front grip is adapted to facilitate a user applying force to the scraper in a direction generally perpendicular to the length of the handle to urge the scraper against the surface to be scraped.

27 Claims, 6 Drawing Sheets

ICE SCRAPER

CROSS-REFERENCE TO RELATED APPLICATIONS

This is a continuation of application Ser. No. 10/174,492, filed Jun. 17, 2002, which under 35 U.S.C. § 119(e)(1) claims the benefit of the filing date of provisional application 60/298, 672 filed on Jun. 15, 2001, the teachings of which are incorporated herein by reference as if set forth fully herein and further claims priority under 35 U.S.C. § 120 based on U.S. application Ser. No. 29/150,906 filed on Nov. 15, 2001, now U.S. Pat. No. D460,589, the content of which is also incorporated herein by reference as if set forth fully herein.

BACKGROUND OF THE INVENTION

The present invention relates to articles commonly referred to as ice scrapers, i.e., hand tools used to mechanically remove materials such as ice, frost, and/or snow from surfaces such as automobile window glass.

SUMMARY OF THE INVENTION

In accordance with the present invention, an ice scraper includes a longitudinally-extending member, referred to herein as a "handle," having a scraper adjacent one end thereof (the "front end") and a grip (the "rear grip") adjacent the other end thereof (the "rear end"). The scraper is adapted to mechanically remove materials such as ice, frost, and/or snow from surfaces such as automobile window glass when placed in contact with such materials or surfaces and moved parallel to the surface. Thus, as used herein, an "ice scraper" is a complete hand tool, whereas a "scraper" is the portion of such a tool that contacts the ice, frost, and/or snow to remove it from such surfaces. As used herein, a "grip" is a structure provided in order to be grasped by a user's hand, and the "handle" is the longitudinally extending structure that transmits to the scraper force that is applied to the rear grip. The rear grip is provided to facilitate a user applying force to the scraper in a direction generally parallel to the length of the handle to move the scraper along the surface to be scraped. An ice scraper in accordance with the present invention also includes a grip adjacent the front end of the handle (the "front grip"). The front grip is provided to facilitate a user applying force to the scraper in a direction generally perpendicular to the length of the handle to urge the scraper against the surface to be scraped.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
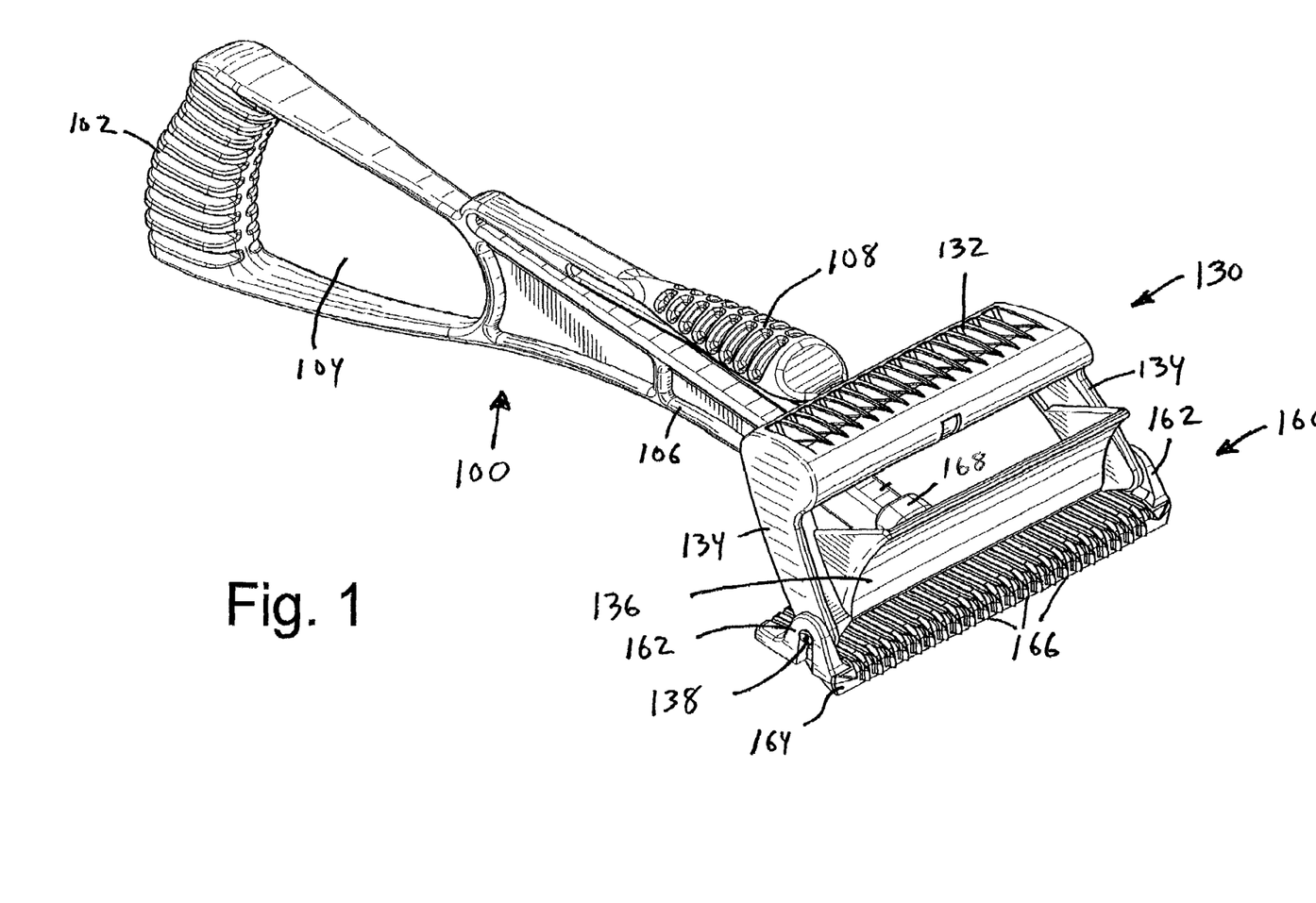
FIG. 1 is a top, front perspective view of a first embodiment of an ice scraper according to the present invention.
Figure 2:
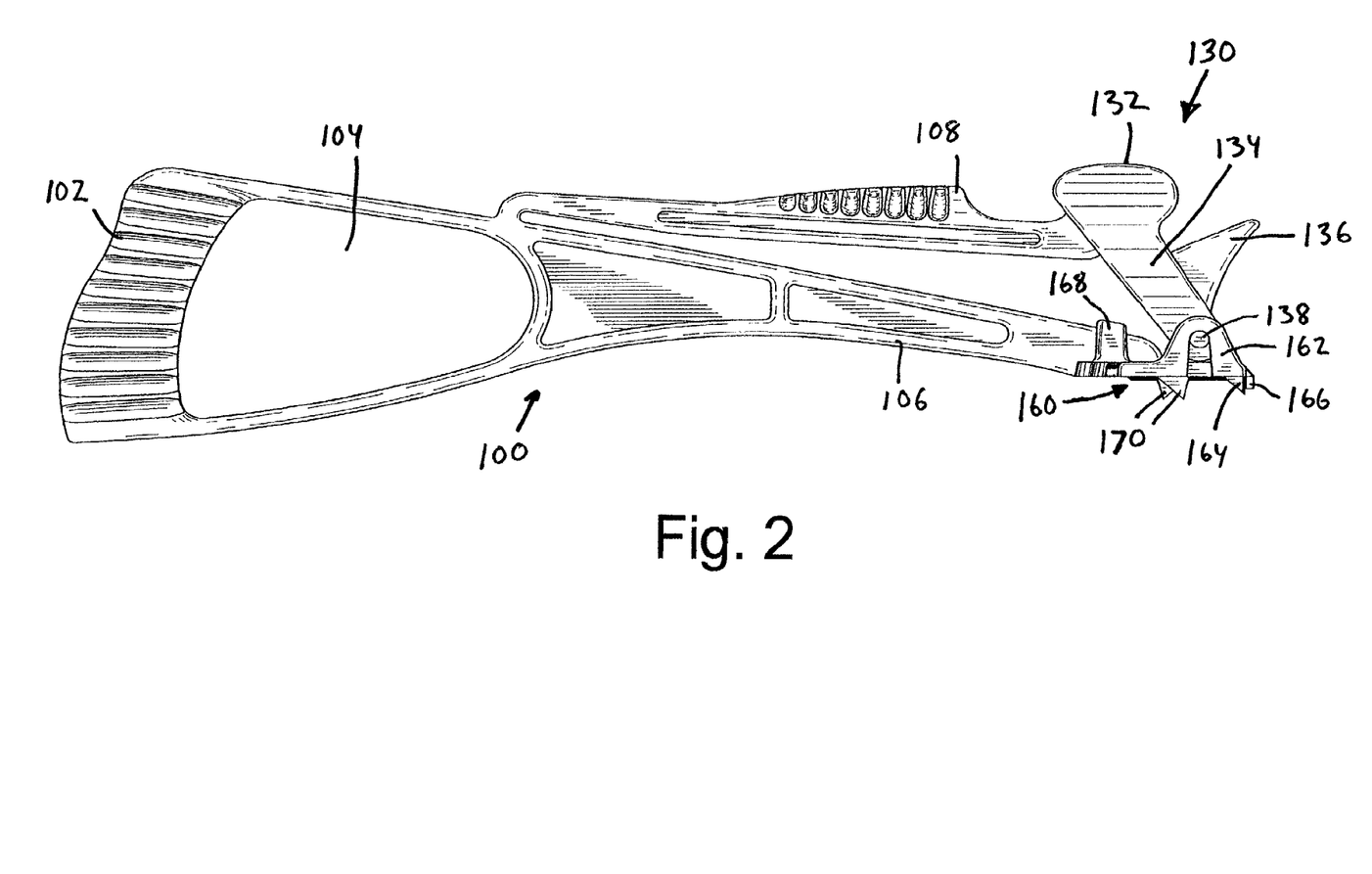
FIG. 2 is a side elevational view of the ice scraper of the first embodiment.
Figure 3:
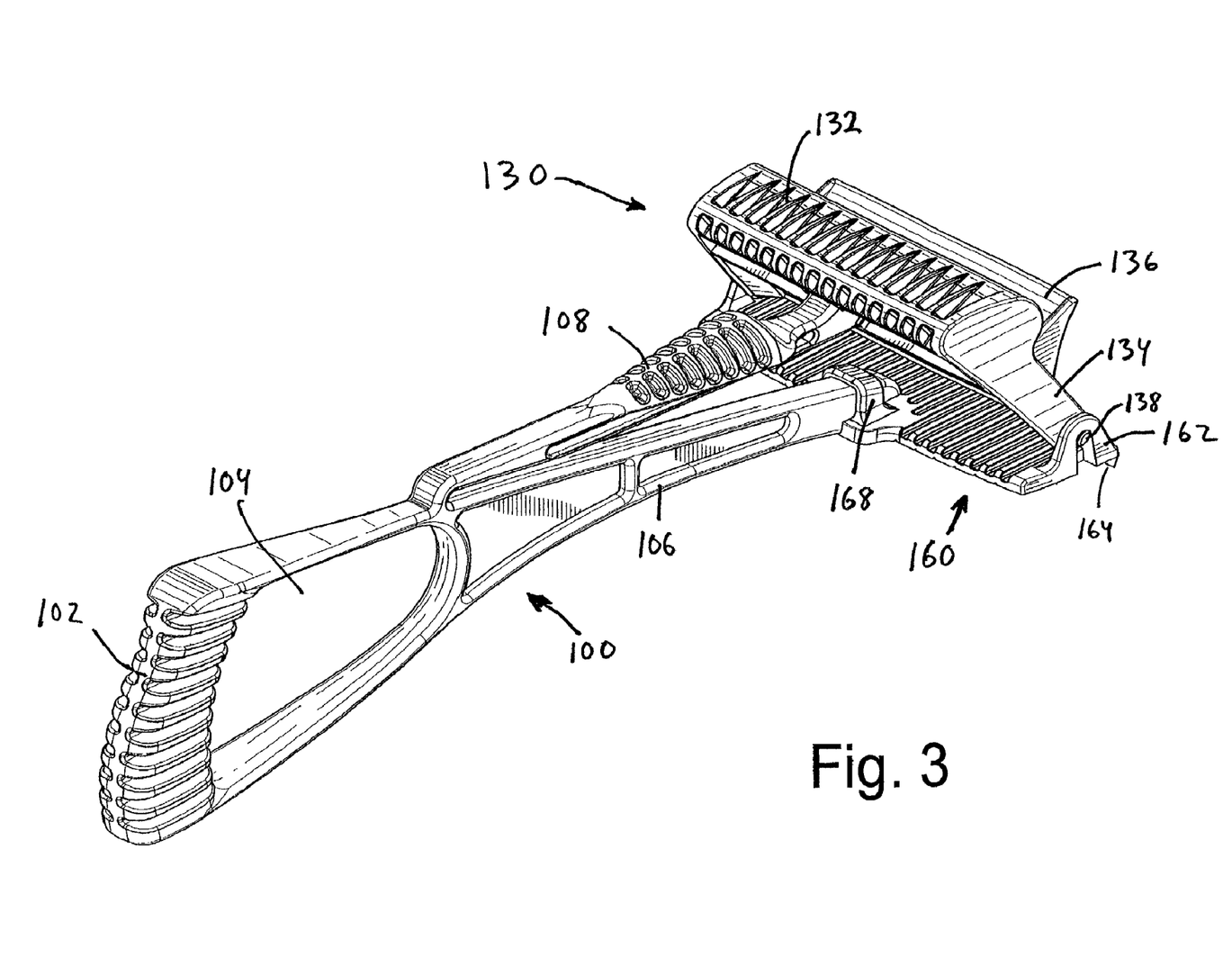
FIG. 3 is a top, rear perspective view of the ice scraper the first embodiment.
Figure 4:
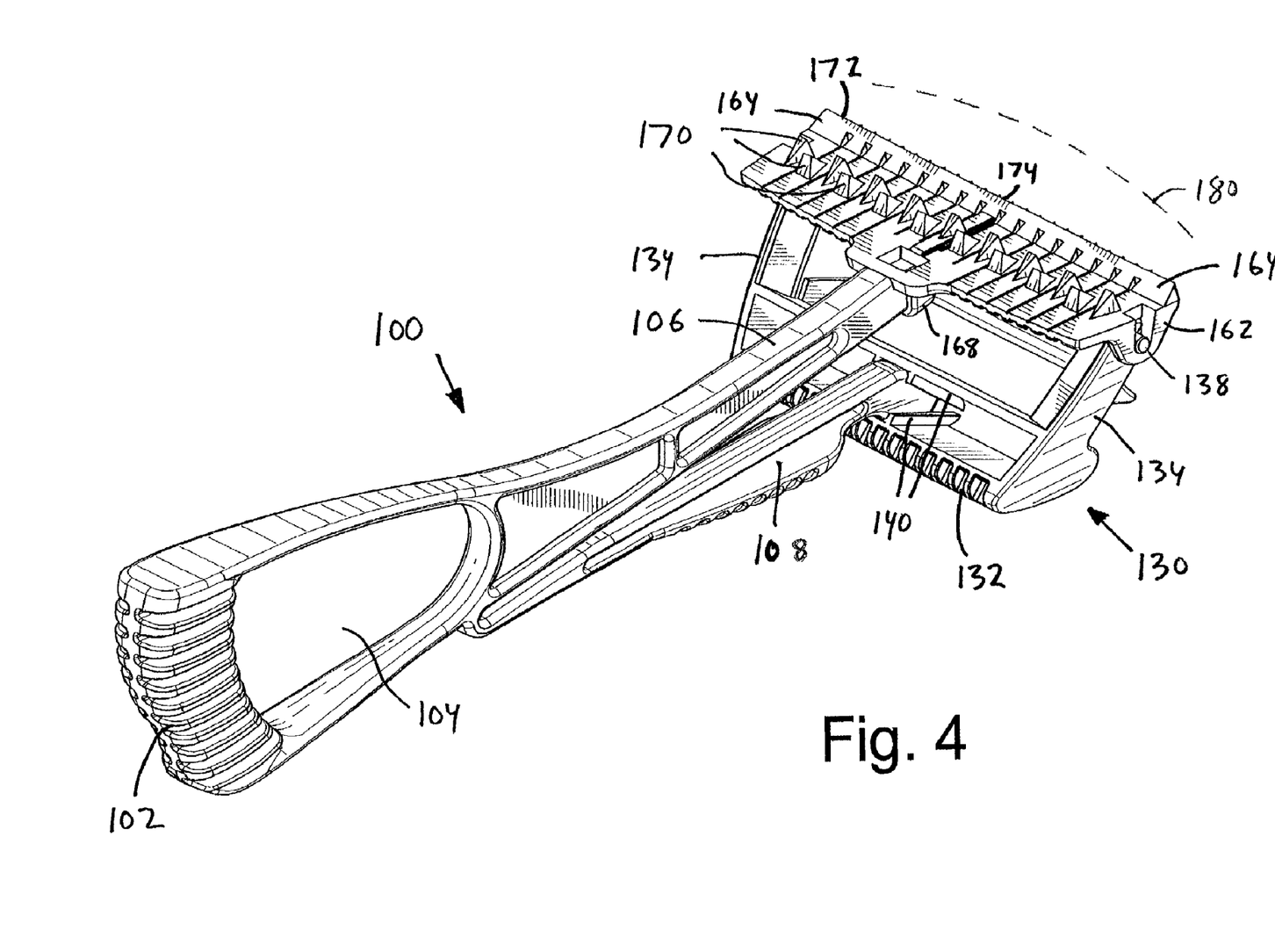
FIG. 4 is a bottom, rear perspective view of the ice scraper the first embodiment.

A first embodiment of the present invention is shown in FIGS. 1-4, of which FIG. 1 is a top, front perspective view, FIG. 2 is a side elevational view, FIG. 3 is a top, rear perspective view, and FIG. 4 is a bottom, rear perspective view. The ice scraper of FIGS. 1-4 includes three components that are assembled to form the scraper as shown: a handle component 100, a scraper component 160, and a front grip component 130. Components 100, 130, and 160 are preferably made of molded plastic.

Scraper component 160 includes three different structures for removing ice, frost, and/or snow from a surface: blade 164, front teeth 166, and bottom teeth 170. Blade 164 has a scraping edge 172 and is a generally straight structure adapted to conform to a flat or moderately curved surface such as an automobile windshield and to wipe snow, sleet, or dislodged frost or ice from the surface in the manner of a squeegee. Front teeth 166, which are mounted just about the scraping surface of blade 164, terminate in points and aid in shearing of the ice by creating areas of high force concentration. Bottom teeth 170 have shapes similar to saw teeth and are mounted in a staggered fashion. Bottom teeth 170 can be used in a front and back motion to rip thick ice. Bottom teeth 170 can also be used in a hammer motion to crack through thick ice. Scraper component 160 is preferably made of polycarbonate, which is strong and also permits scraper component 160 to be somewhat deformable, although other materials can be used. The reasons why deformability is desirable will be discussed later.

Handle component 100 includes a longitudinally-extending handle 106 and a strut 108. The front end of handle 106 is secured to scraper component 160 by being snapped into fastener 168 molded into scraper component 160. In the embodiment shown, the rear portion of handle 106 includes rear grip 102, the configuration of which is similar to a hand saw grip or a pistol grip. An aperture 104 in handle 106 enables a user's hand to surround and grasp rear grip 102. Although rear grip 102 is formed integrally with handle 106 in the embodiment shown, it might be made as a separate component in other embodiments. Handle component 100 is preferably made from polyethylene, although other materials can be used. A user may grasp rear grip 102 in order to apply force to the scraper component 160 in a direction that is generally along the length of handle 106 and generally to the right in the view shown in FIG. 2.

Front grip component 130 includes a front grip 132 and front grip supports 134. Pins 138 near the bottom of front grip supports 134 snap into openings in flanges 162 of scraper component 160 to secure front grip component 130 to scraper component 160. A user may grasp front grip 132 in order to apply force to the scraper component 160 in a direction that is generally perpendicular to the length of handle 106 and generally downward in the view shown in FIG. 2. Strut 108 is secured at one end to handle 106, and at its other end to scraper component 160 by being snapped into fastener 140 molded into front grip component 130. Strut 108 stabilizes front grip component 130 against rotation around pins 138 when force is applied to front grip 132. Strut 108 also may be used as a grip. Front grip component 130 also includes a deflector 136 which functions like a snowplow to help keep snow and ice debris moving away from a cleared area by prevent such debris from passing over the top of scraper component 160 as the ice scraper is moved. Front grip component 130 is preferably made from polyethylene, although other materials can be used.

Figure 5A:
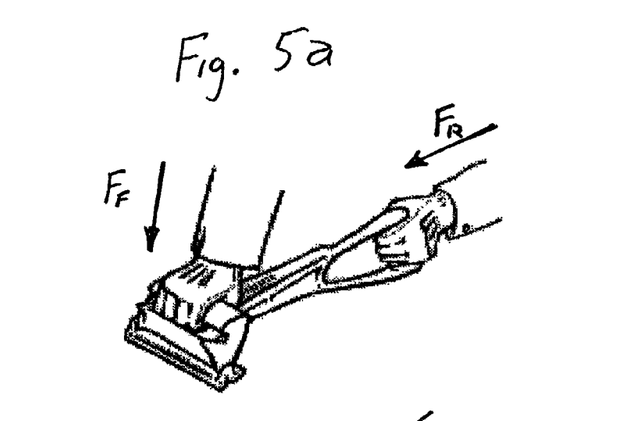
FIGS. 5a and 5b show several ways of gripping the ice scraper the first embodiment.
Figure 5B:
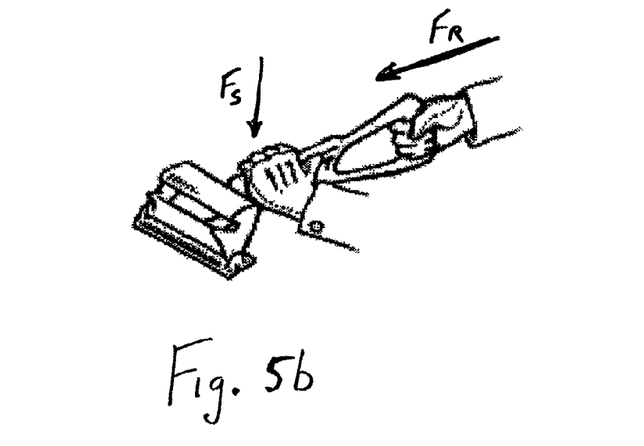

FIGS. 5a and 5b show several ways of gripping the ice scraper of the first embodiment. As shown in FIG. 5a, one of a user's hands grasps rear grip 102 and applies a force $F_R$ directed generally along the length of handle 106 to move the ice scraper across a surface to be cleared of ice, frost, and/or snow, and the user's other hand grasps front grip 132 and applies a force $F_F$ directed generally perpendicular to the length of handle 106 to urge scraper component 160 of the ice scraper against the surface. This method allows the greatest force to be applied to scraper component 160; however, to clear some hard-to-reach spots it may not be possible to grasp and apply downward force to front grip 132. As shown in FIG. 5b, in such situations, the user's hand may grasp strut 108 and apply a force Fs directed generally perpendicular to the length of handle 106 to urge scraper component 160 of the ice scraper against the surface.

The ice scraper of FIGS. 1-4 includes surface texture on rear grip 102, front grip 132, and strut 108. In addition to being ornamental, such texture can aid in a user keeping a strong grasp of the ice scraper during use.

Figure 6A:
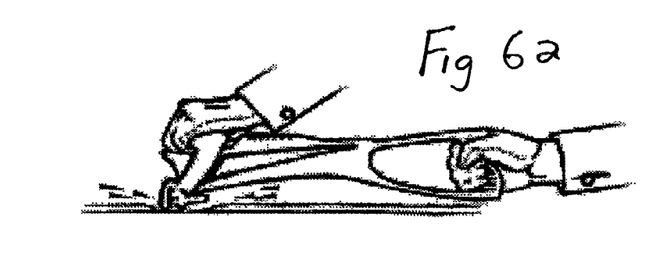
FIGS. 6a, 6b, and 6c show several ways of using the ice scraper the first embodiment.
Figure 6B:
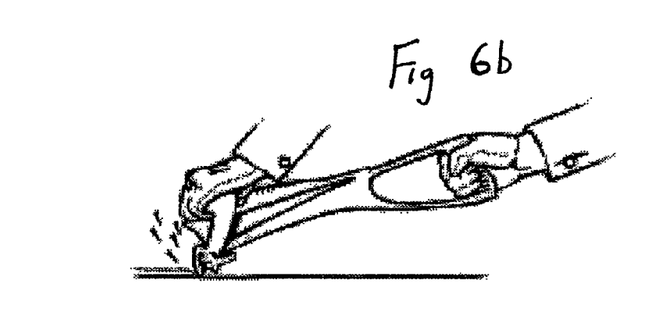
Figure 6C:
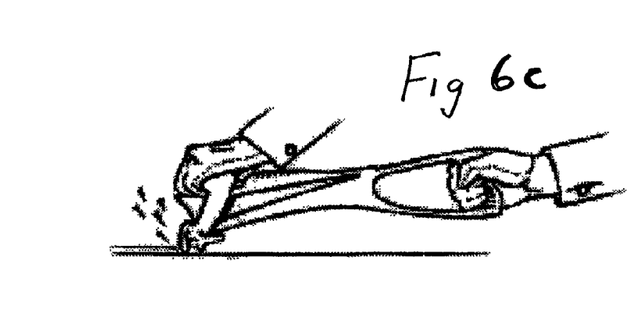

FIGS. 6a, 6b, and 6c show several ways of using the ice scraper the first embodiment. In FIG. 6a, the ice scraper is held at a relatively low angle, nearly parallel to the surface to be cleared, so that bottom teeth 170 contact a thick or tough layer of ice, and moved forward and back in a sawing motion. In FIG. 6b, the ice scraper is held at a steeper "angle of attack," so that front teeth 166 contact a brittle ice or crusty snow ice, and the surface is cleared by forward motion of the ice scraper. In FIG. 6c, the ice scraper is held at an intermediate "angle of attack," so that blade 164 contacts normal ice, frost, or snow, and the surface is cleared by forward motion of the ice scraper.

When scraping using a generally straight blade such as blade 164, it desirable for the blade to contact the surface to be cleared along its entire length. For instance, only a narrow swath is cleared on each stroke when a straight, rigid blade is used to scrape frost from a curved windshield. In order to avoid such problems, scraper component 160 is preferably somewhat flexible so that it can deform sufficiently under the forces applied to the ice scraper to conform to the curvature of surfaces to be scraped.

In the ice scraper of FIGS. 1-4, downward force is applied to scraper component 160 at its ends 10 by front grip supports 134 through pins 138. Therefore, scraper component 160 is preferably made with a slightly bowed shape. The direction of curvature desired for scraper component 160 is shown by line 180 in FIG. 4; the central area 174 of blade 164 is bowed in the upward direction in the view of FIG. 4. With such a curvature, when the ice scraper is brought against a flat surface, the central area 174 of blade 164 will contact the surface first. As is clearly shown in FIG. 1 and elsewhere, scraper component 160 is supported in cantilevered fashion relative to front grip 132 by the front grip supports 134, which are respectively coupled to the flanges 162. Force applied to front grip 132 is coupled to scraper component 160 at its ends, bringing the ends of blade 164 into contact with the surface as scraper component 160 deforms, while central area 174 remains in contact with the surface. The same process occurs when the ice scraper of FIGS. 1-4 is used on a convex surface such as an automobile windshield, except the deformation is greater. Flexing of ice scraper component 160 around a longitudinal axis is facilitated by the corrugated shape of the upper surface of scraper component 160 shown in FIGS. 1 and 3. Flexing of scraper component 160 also maintains front teeth 166 and bottom teeth 170 in contact with a surface to be cleared.

Figure 7:
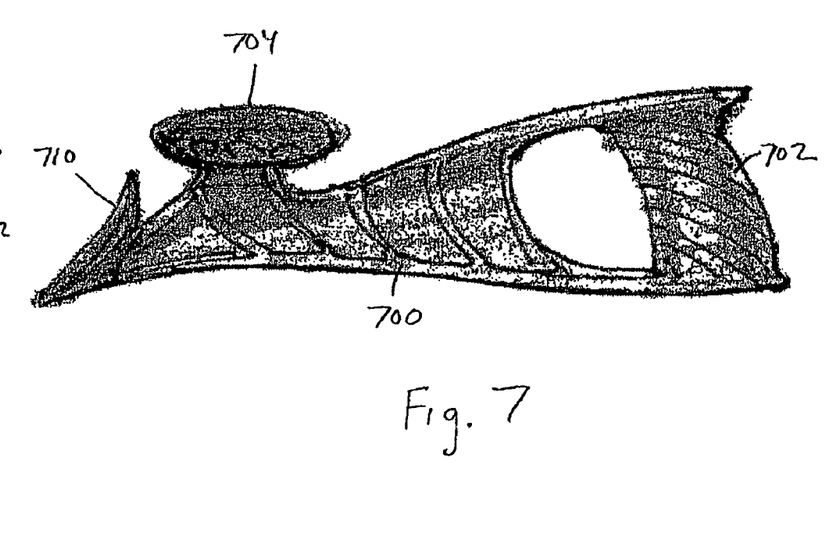
FIG. 7 is a side elevational view of a second embodiment of an ice scraper according to the present invention.
Figure 8:
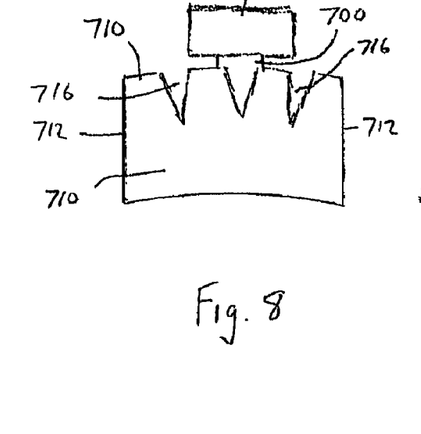
FIG. 8 is a front elevational view of the ice scraper of the second embodiment.

FIG. 7 is a side elevational view and FIG. 8 is a front elevational view of a second embodiment of an ice scraper according to the present invention. The embodiment of FIGS. 7 and 8 includes handle 700 with a saw grip type rear grip 702 and a front grip 704 mounted directly to or fabricated as a part of handle 700. Handle 700 is mounted to the rear side of blade 710 midway between the lateral edges 712 thereof. The lower, scraping edge of blade 710 is curved in the opposite direction from that of front grip component 130. The upper portion of blade 710 functions as a deflector to help keep snow and ice debris moving away from the cleared area. When the ice scraper of FIGS. 7 and 8 is brought against a flat surface, the ends of blade 710 will contact the surface first. Force applied to front grip 704 is coupled to scraper blade 710 in the middle, bringing it into contact with the surface as scraper blade 710 deforms, while the blade ends remain in contact with the surface. Flexing of blade 710 around a longitudinal axis is facilitated by the notches 716 in its upper edge.

Figure 9:
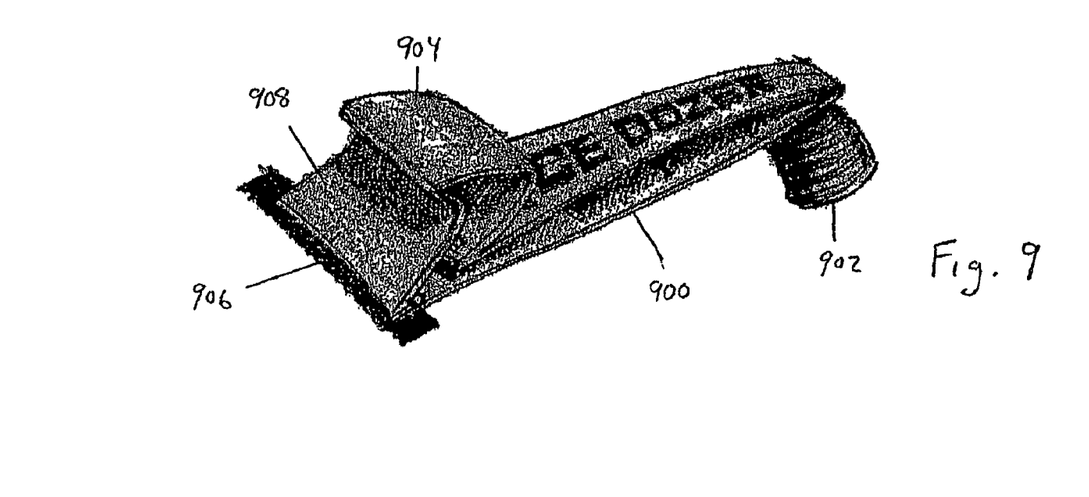
FIG. 9 is a top, front perspective view of a third embodiment of an ice scraper according to the present invention.

FIG. 9 is a top, front perspective view of a third embodiment of an ice scraper according to the present invention. In the ice scraper of FIG. 9, a handle 900, rear grip 902, front grip 904, and deflector 908 may be molded as a single piece. Scraper 906, which may be like scraper component 160 of FIGS. 1-4, is secured adjacent the front of handle 900.

The ice scraper of the present invention is suited to a person's normal positions and motions. Ergonomic features of the design, including a front grip and a saw-style rear grip, aid in the generation of scraping force from a person's natural positions and movements.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Other embodiments of the present invention may include a larger handle with greater reach, and a telescoping or folding handle, which allow a user to scrape over a longer distance, such as for larger trucks and SUV's. It will be further understood that various other changes in the details, materials, and arrangements of the parts which have been described and illustrated in order to explain the nature of this invention may be made by those skilled in the an without departing from the scope of the invention as expressed in the following claims.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A tool for removing ice from a vehicle comprising:
a handle;
a scraper component connected to said handle; and
wherein said scraper component comprises a planer surface; a flexible blade member, wherein the flexible blade member comprises a blade scraping edge and is made of a conformable material in order to conform to the shape of a surface and wherein said flexible blade member is adjacent to said planer surface; front teeth which extend in front of said blade scraping edge and is located adjacent to said blade scraping edge, wherein said front teeth are adapted to shear ice, and bottom teeth located on a bottom surface of said scraper component, wherein said bottom teeth are adjacent and separate from the blade scraping edge, wherein said bottom teeth extend outward and perpendicular to said planer surface so as to be adapted to crack ice.

2. The tool of claim 1, wherein said bottom teeth are mounted in a staggered fashion.

3. The tool of claim 1, further comprising a deflector component proximate to said scraper component and the first end of said handle.

4. The tool of claim 3, wherein said deflector component is concaved shape.

5. The tool of claim 3, wherein the handle is arched and adapted to facilitate a user applying force to the scraper.

6. The tool of claim 5, wherein said scraper component has at least one flange having a slot, and further comprising a front grip having a pin.

7. A tool according to claim 1, wherein said blade member has a slightly bowed shape.

8. A tool according to claim 1, wherein said blade member is fabricated from a strong flexible plastic material.

9. A tool for removing ice from a vehicle comprising:
a main body portion;
a flexible scraper blade comprising a blade scraping edge, said flexible scraper blade being fabricated from a flexible material and having a first mounting structure and a second mounting structure that is spaced from said first mounting structure, said flexible scraper blade further comprising a plurality of front teeth which extend in front of said blade scraping edge and is located adjacent to said blade scraping edge, wherein said front teeth facilitate the shearing of ice, a corrugated upper surface, whereby flexibility of said flexible scraper blade, is enhanced, and a plurality of bottom teeth located on a bottom surface of said scraper blade, wherein said bottom teeth are adjacent and separate from the blade scraping edge, wherein said bottom teeth facilitate the breaking of ice; and
cantilever mounting means for mounting said flexible blade relative to said main body portion, said cantilever mounting means comprising first and second blade support members respectively being connected to said first and second mounting structures, whereby said blade is supported in cantilevered fashion so as to permit flexure of a portion of said blade that is between said first mounting structure and said second mounting structure so as to substantially conform with a surface that is intended to be scraped.

10. The tool of claim 9, wherein said bottom teeth are mounted in a staggered fashion.

11. The tool of claim 9, further comprising a snowplow deflector positioned adjacent to said flexible scraper blade.

12. The tool of claim 11, wherein said snowplow deflector component has a concave shape.

13. The tool of claim 9, wherein said main body portion comprises a handle that is arched and adapted to facilitate a user applying force to the flexible scraper blade.

14. The tool of claim 9, wherein at least one of said first and second mounting structure comprises a flange having a slot defined therein, and said cantilevered mounting means comprises a pin that is adapted to fit into said slot.

15. A tool according to claim 9, wherein said flexible scraper blade is fabricated from a strong flexible plastic material.

16. A tool according to claim 9, wherein said flexible scraper blade has a slightly bowed shape, whereby a central portion of said flexible scraper blade that is between said first and second mounting structures will tend to first contact a surface to be scraped.

17. A tool for removing ice from vehicle comprising:
a longitudinally extending main body portion;
a front grip member said front grip member being connected to said longitudinally extending main body portion, wherein said front grip member is angularly oriented with respect to said main such that said front grip member and said main body portion are situated in different planes;
flexible scraper blade comprising
a first mounting structure:
a second mounting structure, wherein said second mount structure is spaced from said first mounting structure: and
a third mounting structure that is positioned intermediate of said first and second mounting structures and wherein said third mounting structure extends from said main body portion to said front grip member,
wherein said front grip member is positioned substantially above said flexible scraper blade;
first and second blade support members depending downwardly from said front grip member, said first and second blade support members respectively being connected to said first and second mounting whereby said blade is supported in cantilevered fashion relative to said front grip member so as to permit flexure of a portion of said blade that is between said first mounting structure and said second mounting structure so as to substantially conform with a surface that is intended to be scraped when a downward force is applied to said front grip member.

18. A tool according to claim 17, wherein said flexible scraper blade is fabricated from a strong flexible plastic material.

19. A tool according to claim 17, wherein said flexible scraper blade has a slightly bowed shape, whereby a central portion of said flexible scraper blade that is between said first and second mounting structures will tend to first contact a surface to be scraped.

20. A tool according to claim 17, wherein said flexible scraper blade has a corrugated upper surface, whereby flexibility of said flexible scraper blade is enhanced.

21. A tool according to claim 17, wherein said flexible scraper blade has a plurality of front teeth that facilitate the shearing of ice.

22. A tool according to claim 17, wherein said flexible scraper blade has a plurality of bottom teeth that facilitate the breaking of ice.

23. A tool according to claim 17, wherein said bottom teeth are mounted in staggered fashion.

24. A tool according to claim 17, wherein said main body portion is connected to said flexible scraper blade via said third mounting structure.

25. A tool according to claim 17, wherein said front grip member is elongated generally along a longitudinal axis that is substantially perpendicular to a longitudinal axis of said main body portion.

26. A tool according to claim 17, wherein said flexible scraper blade extends generally along a longitudinal axis that is substantially parallel to said longitudinal axis of said front grip member.

27. A tool according to claim 17, wherein said front grip member is elongated generally along an longitudinal axis and wherein said flexible scraper blade extends generally along a longitudinal axis that is substantially parallel to said longitudinal axis of said front grip member.

* * * * *

UNITED STATES PATENT AND TRADEMARK OFFICE
CERTIFICATE OF CORRECTION

PATENT NO. : 7,526,831 B2  Page 1 of 1
APPLICATION NO. : 11/623867
DATED : May 5, 2009
INVENTOR(S) : Marvin Weinberger and Tucker J. Marion It is certified that error appears in the above-identified patent and that said Letters Patent is hereby corrected as shown below:

Column 6, line 38, please insert the word --structure-- before the word, "whereby."

Column 6, line 25, please replace ":" with --;--

Column 6, line 28, please replace ":" with --;--

Signed and Sealed this

Fourth Day of August, 2009

JOHN DOLL
*Acting Director of the United States Patent and Trademark Office*